United States Patent [19]

Kunugi et al.

[11] Patent Number: 4,655,053
[45] Date of Patent: Apr. 7, 1987

[54] AIR-COOLED ABSORPTION REFRIGERATION SYSTEM

[75] Inventors: Yoshifumi Kunugi; Shigeo Sugimoto; Kyoji Kohno; Tomihisa Ouchi; Kenji Machizawa, all of Ibaraki, Japan

[73] Assignee: Hitachi, Ltd., Tokyo, Japan

[21] Appl. No.: 809,907

[22] Filed: Dec. 17, 1985

[30] Foreign Application Priority Data

Dec. 19, 1984 [JP] Japan ................................ 59-266102

[51] Int. Cl.⁴ .............................................. F25B 15/00
[52] U.S. Cl. ......................................... 62/476; 62/494
[58] Field of Search ................................... 62/494, 476

[56] References Cited

U.S. PATENT DOCUMENTS

| | | |
|---|---|---|
| 1,664,472 | 4/1928 | Von Platen et al. ............ 62/494 X |
| 1,669,269 | 5/1928 | Von Platen et al. ............ 62/494 X |
| 3,283,533 | 11/1966 | Aronson ................................ 62/494 |
| 3,353,369 | 11/1967 | Whitlow ................................ 62/494 |
| 3,605,873 | 9/1971 | Leonard, Jr. ...................... 62/476 X |
| 3,990,263 | 11/1976 | Ainbinder et al. ..................... 62/476 |
| 4,183,228 | 1/1980 | Saito et al. ......................... 62/476 X |
| 4,563,882 | 1/1986 | Kunugi et al. ......................... 62/476 |

Primary Examiner—Lloyd L. King
Attorney, Agent, or Firm—Antonelli, Terry & Wands

[57] ABSTRACT

An air-cooled absorption refrigeration system wherein refrigerant vapor is introduced into a vertical tube absorber at the top and bottom, or top, bottom and center thereof so as to allow the refrigerant vapor to flow into the absorber at different scattered positions whereby a sufficient flow passage area for the refrigerant vapor is smoothly secured and the refrigerant vapor is received by the absorber.

11 Claims, 4 Drawing Figures

AIR-COOLED ABSORPTION REFRIGERATION SYSTEM

BACKGROUND OF THE INVENTION

This invention relates to an air-cooled type absorption refrigeration system.

In, for example, U.S. Pat. No. 4,467,623, a conventional air-cooled absorption refrigeration system is described which includes a generator, a condenser, an evaporator, and an absorber, with the absorber having a plurality of vertical tubes for receiving, at top ends thereof, a strong absorbent solution from the generator and for receiving, at bottom ends thereof, refrigerant vapor from the evaporator whereby the refrigerant vapor is absorbed by the strong absorbent solution to form a weak absorbent solution.

However, since the volume flow rate of the refrigerant vapor flowing from the evaporator to the absorber is very high, the refrigerant vapor remains at the bottom end of the vertical tube absorber and does not readily flow up inside of the vertical tubes. Thus, the refrigerant vapor does not reach the center and the vicinity of the top of the vertical tube absorber, and the absorption effect is not efficiently exhibited at such sections of the absorber.

Also, since the volume flow rate of the refrigerant vapor flowing from the evaporator to the absorber is very high as described above, a sufficient passage area for the refrigerant vapor is not obtained only with the bottom end of the vertical tube absorber, and it is not always possible to make the refrigerant vapor smoothly flow to the absorber. As a result, the vapor pressure inside of the evaporator becomes high, evaporation of the refrigerant is suppressed, and the chilling effect decreases. Further, since there is provided only one position for taking out the vapor from the evaporator, the flow condition of the refrigerant vapor inside of the evaporator is deteriorated, and the chilling effect decreases.

The primary object of the present invention is to provide an air-cooled absorption refrigeration system wherein the refrigerant vapor evaporated in the evaporator reaches the whole region of the air-cooled vertical tube absorber.

Another object of the present invention is to provide an air-cooled absorption refrigeration system wherein a weak absorbent solution is created by the air-cooled vertical tube absorber.

A further object of the present invention is to provide an air-cooled absorption refrigeration system wherein the refrigerant vapor is smoothly supplied to the air-cooled vertical tube absorber.

To attain the above objects, according to the present invention, the evaporator and the vertical tube absorber are made to communicate with each other through communication passages arranged at the top and bottom or the top, bottom and the central parts, respectively, of the absorber so as to cause a downward flow of the absorbent solution to generate through the vertical tubes whereby the refrigerant vapor received from the top end of the tubes is directed downward to be absorbed by the absorbent solution.

DETAILED DESCRIPTION

Figure 1:
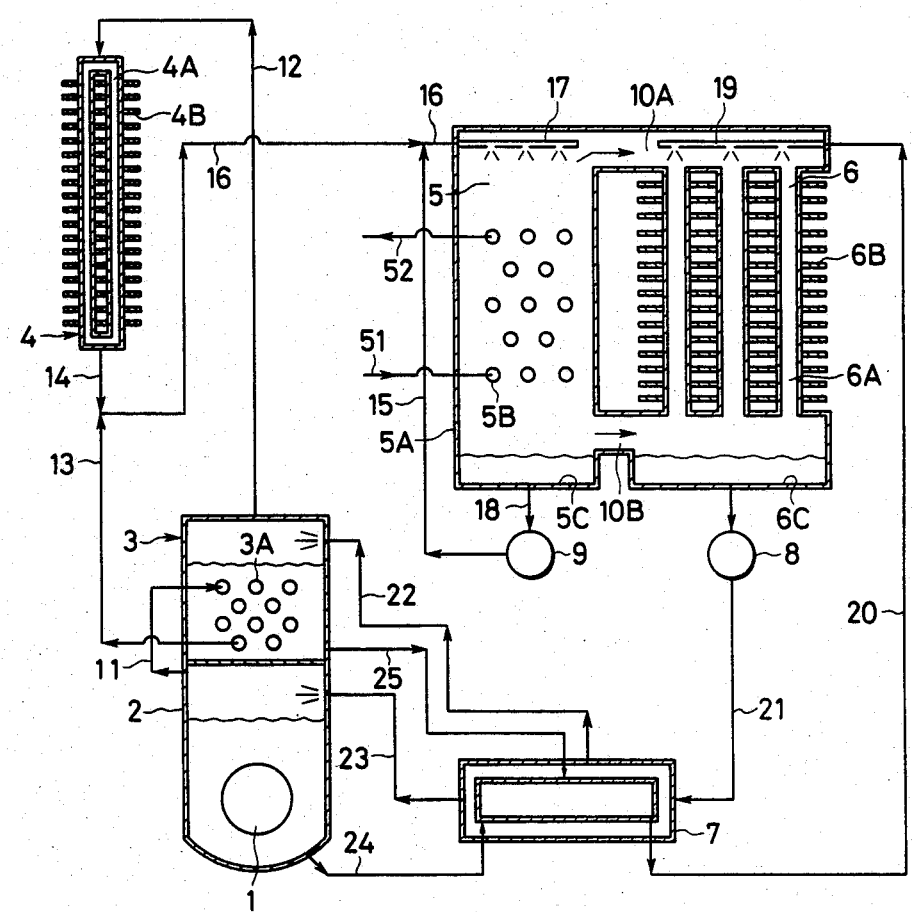
FIG. 1 is a schematic view of a first embodiment of the present invention.

Referring now to the drawings wherein like reference numerals are used throughout the various views to designate like parts and, more particularly, to FIG. 1, according to this figure, an air-cooled absorption refrigeration system according to the present invention is proposed wherein the refrigerant vapor is received by a vertical tube absorber at top and bottom ends of a plurality of vertical tubes, with the system using water as a refrigerant and lithium bromide as an absorbent. The system includes a first generator 2 having a heat source 1 such as, for example, a burner, a second generator 3 using, as a heat source, refrigerant vapor generated by the first generator 2, an air-cooled condenser 4 for air-cooling and condensing the refrigerant vapor generated by the second generator 3, an evaporator 5 for cooling a substance (water) to be cooled by evaporating a refrigerant solution, an air-cooled absorber 6 comprising a plurality of vertical tubes, a solution heat exchanger 7, a solution pump 8 and a refrigerant pump 9. The evaporator 5 comprises a shell 5A, a cooling pipe 5B and a refrigerant solution sump 5C. The air-cooled absorber 6 is formed of a plurality of vertical tubes 6A arranged substantially perpendicular, fins 6B attached to the outer sides of the tubes 6A and a weak solution sump 6C and communicates with the interior of the shell 5A of the evaporator 5 at the top and bottom ends of the tubes 6A through communication passages 10A and 10B which extend substantially in the horizontal direction.

Within the first generator 2 there is injected an aqueous solution of lithium bromide consisting essentially of a mixture of the refrigerant and the absorbing agent. This aqueous solution is heated by a burner 1 to generate refrigerant vapor which condenses the solution. The refrigerant vapor thus generated flows into heat tubes 3A of the second generator 3 through a refrigerant line 11. The aqueous solution of lithium bromide is also injected into the second generator 3. It is heated by the refrigerant vapor within the heat pipes 3A to also generate refrigerant vapor so that the aqueous solution of lithium bromide is condensed and the refrigerant vapor in the heat tubes 3A is liquefied.

The refrigerant vapor generated in the second generator 3 enters the condenser 4 through a refrigerant line 12 while the refrigerant liquefied in the heat tubes 3A comes to join refrigerant vapor in a refrigerant line 14 through a refrigerant line 13. The condenser 4 has a fin 4B comprising a number of fin elements attached to the outer side of its tube 4A and since air from a fan (not shown) flows among the fin elements, refrigerant air in the condenser 4 is cooled by the air and liquefied. This liquefied refrigerant passes through the refrigerant line 14, joins the liquefied refrigerant from the refrigerant line 13 as aforesaid and, after passing through a refrigerant line 16, further joins a liquid refrigerant discharged from the refrigerant pump 9 through a refrigerant line 15, at the intermediate portion of the refrigerant line 16 so as to enter the evaporator 5 through the refrigerant line 16.

Within the evaporator 5 there is arranged a cool water pipe 5B and the abovementioned liquid refrigerant is sprayed over the pipe 5B from a sprayer 17. In this case, as the pressure in the evaporator 5 is kept low, the liquid refrigerant vaporizes to deprive cool water in the pipe 5B of its latent heat so that water introduced into the pipe 5B from a conduit 51 is cooled and is derived from a conduit 52. In this case, a part of the liquid refrigerant which has failed to evaporate pools in a refrigerant sump 5C and returns back to the refrigerant line 16 through a refrigerant line 18, the refrigerant pump 9 and a refrigerant line 15 so as to repeat the abovementioned operations. Then the evaporated refrigerant vapor flows into the vertical tubes 6A of the absorber 6 through the communication passages 10A and 10B.

Further, there are provided a plurality of sprayers 19 above the vertical tubes 6A, respectively, so that a strong (or concentrated) solution passing through a strong solution line 20 is sprayed from the sprayers 19. The sprayed strong solution is cooled by air flowing outside the vertical tubes 6A as it flows down along the walls of the tubes so that the pressure of water vapor within the vertical tubes 6A lowers and the refrigerant vapor flows into the tubes 6A through the communication passages 10A and 10B where the refrigerant vapor absorbs the refrigerant vapor from the evaporator 5 to become a weak (or diluted) solution and pools in a solution sump 6C.

In order to improve the transmission of heat among fins 6B, preferably slit-fins of the type described in, for example, U.S. Pat. No. 4,300,629, may be used.

Further, helical plates or other paddings (not shown) are inserted into the vertical tubes 6A to promote contact between the strong solution and the walls of the tubes or between the strong solution and the refrigerant. Moreover, each vertical tube 6A fins or grooves (not shown) in the inner surface thereof thereby improving the transmission of heat within the tube.

The weak solution pooled within the sump 6C is sucked by the solution pump 8, introduced into the solution heat exchanger 7 for preheating and after it is branched off at the intermediate part of the heat exchanger, enters the second generator 3 via a weak solution line 22. The remaining part of the solution is further preheated by the heat exchanger 7 and enters the first generator 2 via a weak solution line 23.

At the same time, the strong solution in the first generator 2 enters the heat exchanger 7 via a strong solution line 24, cools itself as it heats the weak solution, joins the strong solution which has entered the intermediate part of the heat exchanger 7 from the second generator 3 through a strong solution line 25 and then enters the absorber 6 through the strong solution line 20 as it continues to heat the weak solution.

Thus, in the case of the present invention, a sufficient number of passages have been provided for the low pressure refrigerant vapor flowing from the evaporator 5 to the absorber 6 so that it is possible to realize an air-cooled absorber.

Figure 2:
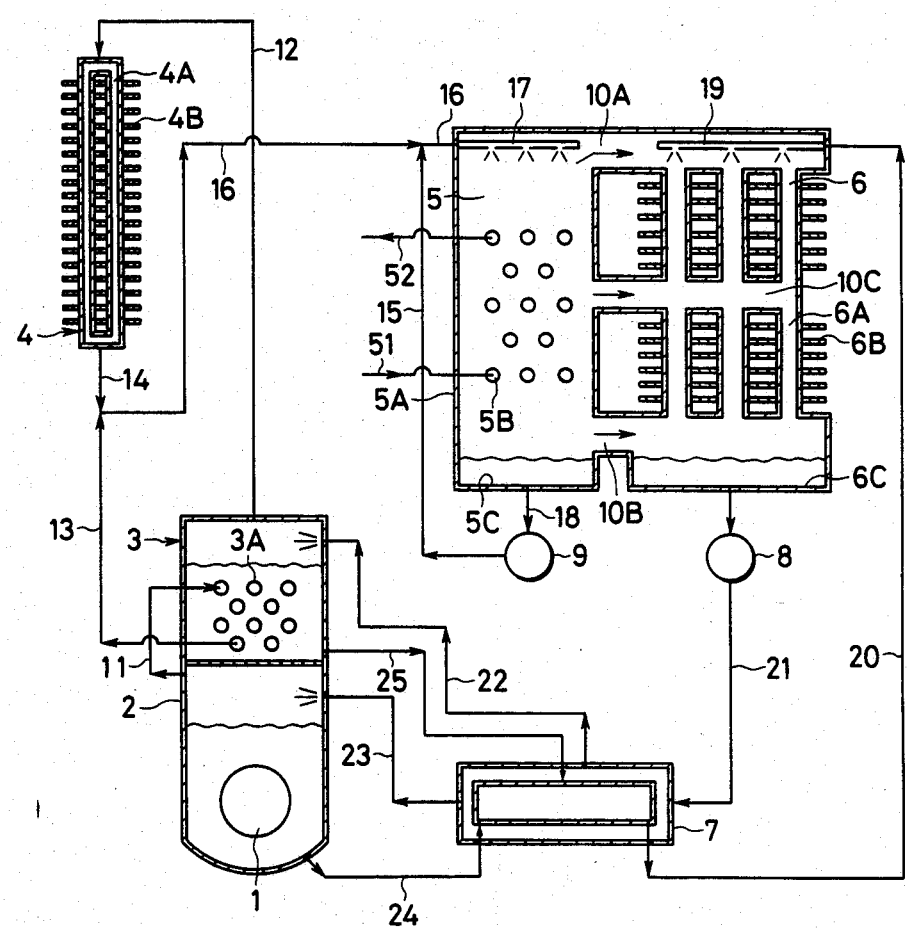
FIG. 2 is a schematic view of a second embodiment of the present invention.

In the embodiment of FIG. 2, the communication between the evaporator 5 and the absorber 6 with respect to the refrigerant vapor is accomplished by a central communication passage 10C in addition to the upper and bottom communication passages 10A and 10B. Therefore, the refrigerant vapor evaporated by the evaporator 5 enters the vertical tubes 6A of the absorber 6 through the passages 10A, 10B and 10C.

Thus, since the number of paasages for the low pressure refrigerant vapor from the evaporator 6 to the absorber 5 have been increased in the embodiment of FIG. 2, it is possible to realize an air-cooled abosorber which is capable of generating a still stronger solution.

Figure 3:
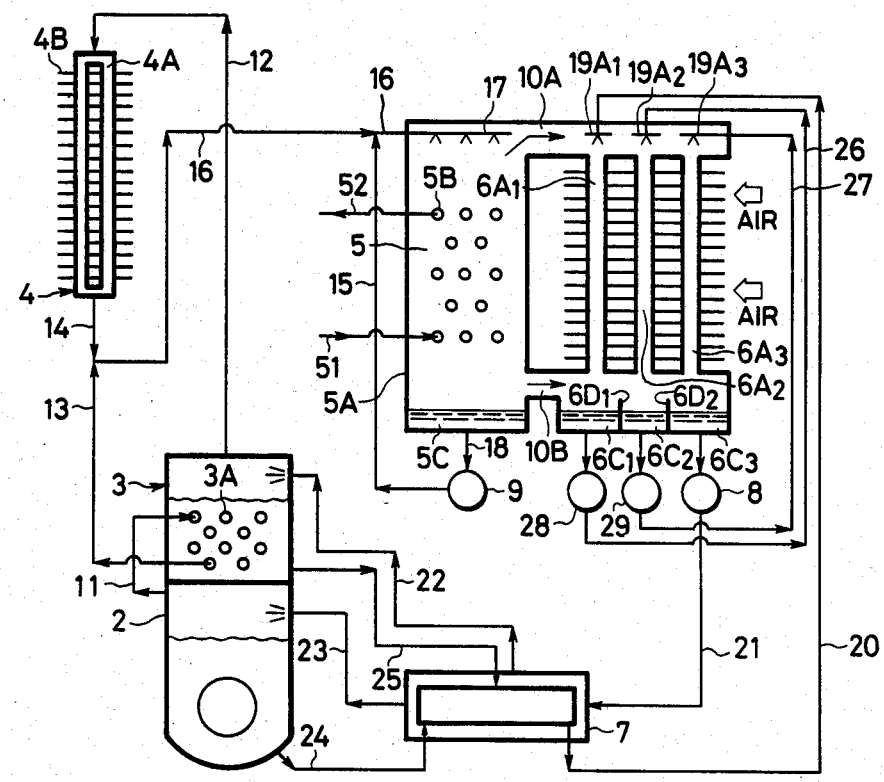
FIG. 3 is a schematic view of a third embodiment of the present invention.

Referring to FIG. 3, the solution sump 6C in the absorber 6 is provided with first, second and third solution sumps to be divided by the partitions into three sections 6C1, 6C2 and 6C3, respectively. The number of such divisions is not always limited to three but it may be two or larger than three. Further, the number of the sprayers 19, that is, 19A1, 19A2 and 19A3 corresponds to that of the refrigerant sumps 6C. The first sprayer 19A1 which is adapted to spray solution into a vertical tube 6A1 located on the outlet side of the cooling air is connected with the strong solution line 20, the second sprayer 19A2 which is adapted to spray solution into a vertical tube 6A2 is connected with a solution line 26 extending from the first solution sump 6C1 and the sprayer 19A3 which is adapted to spray solution into a vertical tube 6A3 located on the inlet side of the cooling air is connected with a solution line 27 extending from the second solution sump 6C2, and the third solution sump 6C3 is in communication with the solution pump 8. In addition, the solution lines 26 and 27 are in communication with solution pumps 28 and 29, respectively.

With the above arrangement, a strong solution flowing through the solution line 20 via the heat exchanger 7 is sprayed into the vertical tube 6A1 from the first sprayer 19A1 and flows down along the vertical tube 6A1 during which it is diluted with a refrigerant vapor received by the tube 6A1 at the top and bottom thereof and pools within the first solution sump 6C1. The solution pooled within the sump 6C1 is then fed to the second sprayer 19A2 through the solution line 26 and is sprayed into the vertical tube 6A2 by the second sprayer 19A2. This sprayed solution is diluted by absorbing the refrigerant vapor and pools within the second solution sump 6C2 as in the case with the vertical tube 6A1. The solution pooled within the solution sump 6C2 is then fed to the third sprayer 19A3 via the pump 29 and the solution line 27 and sprayed into the vertical tube 6A3 by the third sprayer 19A3. Then the sprayed solution is diluted further by absorbing the refrigerant vapor in the same process as in the case with the vertical tube 6A2 and pools within the third solution sump 6C3 so that it is fed to the first and second generators 2 and 3 by the solution pump 8 via the heat exchanger 7.

As described above, the embodiment of FIG. 3 is effective in that the weak solution is generated gradually by three absorption steps.

Figure 4:
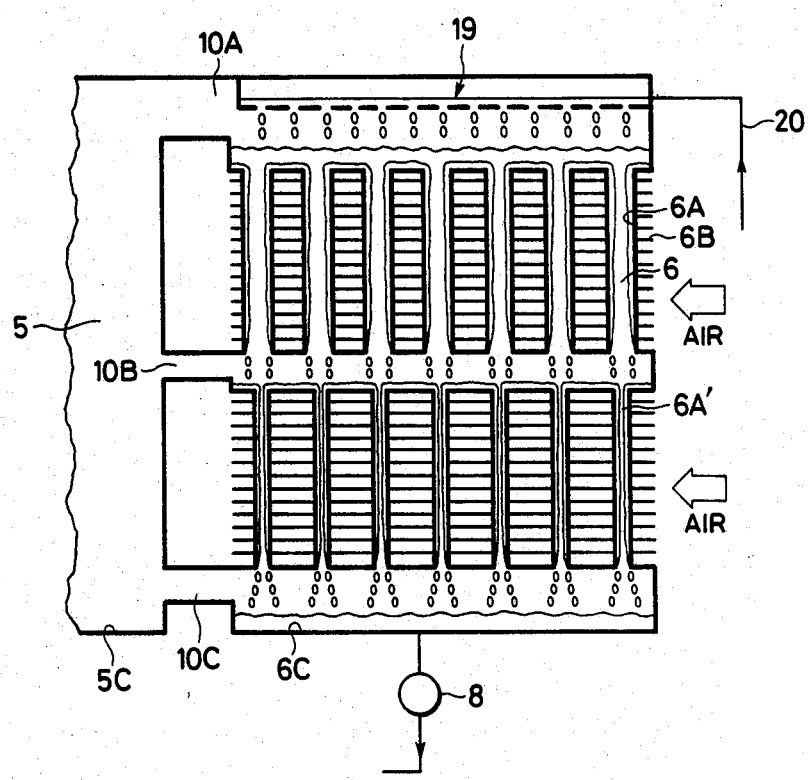
FIG. 4 is a schematic view of a portion of a fourth embodiment of the present invention.

FIG. 4 shows a fourth embodiment of the present invention in which only the structure of the absorber shown in FIGS. 1 through 3 is modified. According to the embodiment of FIG. 4, the sectional area of the interior of each of a lower group of vertical tubes 6A' is made smaller than that of each of an upper group thereof with the tubes of the same group having the same diameter through the vertical length thereof. Alternatively, it is possible to reduce the number of tubes 6A' to obtain the same effect.

What is claimed is:

1. In an air-cooled absorption refrigeration system provided with a first generator having a heat source, a second generator using, as a heat source, refrigerant vapor generated from the first generator, an air-cooled condenser adapted to cool the refrigerant medium carried from the first generator and the second generator, respectively, an evaporator adapted to cool a medium to be cooled, an air-cooled absorber having a plurality of vertical tubes and a solution heat exchanger, the improvement comprising a plurality of communication passages adapted to establish a communication between each of the vertical tubes of said absorber and an interior of a shell of said evaporator, said communication passages being respectively arranged at different heights in a direction of the height of each of said vertical tubes whereby the refrigerant vapor from said evaporator is introduced into each of said communication passages and is then received by said communication passages arranged at different heights.

2. In an air-cooled absorption refrigeration system provided with a first generator having a heat source, a second generator using, as a heat source, refrigerant vapor generated from the first generator, an air-cooled condenser adapted to cool the refrigerant medium carried from the first generator and the second generator respectively, an evaporator adapted to cool a medium to be cooled, an air-cooled absorber having a plurality of vertical tubes and a solution heat exchanger, the improvement comprising a plurality of communication passages arranged such that said communication passages communicate with said evaporator at different positions in the direction of a height of each of the vertical tubes of said absorber whereby refrigerant vapor from said evaporator is introduced into said communication passages at different positions in the direction of the height of each of said vertical tubes, and said tubes receive the refrigerant vapor from said communication passages at different positions with respect to the height of each of said tubes.

3. The air-cooled absorption refrigeration system according to claim 2, wherein said communication passages establish communication between the top and bottom of said absorber and said evaporator.

4. The air-cooled absorption refrigeration system according to claim 2, wherein said communication passages are arranged to establish communication between the top, bottom and middle part of said absorber.

5. The air-cooled absorption refrigeration system according to claim 2, wherein the vertical tubes of said absorber are arranged in an upper group and a lower group and a sectional area of the interior of each of the tubes belonging to the lower group is smaller than a sectional area of the interior of each of the tubes belonging to the upper group.

6. The air-cooled absorption refrigeration system according to claim 5, wherein an the inner diameter of each of said vertical tubes belonging to the lower group is smaller than an inner diameter of each of the tubes belonging to the upper group.

7. The air-cooled absorption refrigeration system according to claim 2, wherein said communication passages extend substantially in a horizontal direction.

8. An air-cooled absorption refrigeration system provided with a first generator having a heat source, a second generator using, as a heat source, refrigerant vapor generated from the first generator, an air-cooled condenser adapted to cool the refrigerant medium carried from the first generator and the second generator, respectively, an evaporator adapted to cool a medium to be cooled, an air-cooled absorber comprising a plurality of vertical tubes and a solution heat exchanger, the improvement comprising a plurality of communication passages extending among the vertical tubes of said absorber at least at the top and bottom thereof so that refrigerant vapor from said evaporator is introduced into said vertical tubes at the top and bottom thereof, a plurality of sprayers respectively arranged above said vertical tubes, and a solution subdivided into a plurality of sections such that a solution in the sump is sequentially fed to the sprayers and a strong solution from said heat exchanger is sprayed into said vertical tubes after it is fed to said sprayers and diluted with refrigerant vapor introduced into said vertical tubes through said communication passages, whereby a series of absorption operations is performed in at least two steps.

9. The air-cooled absorption refrigeration system according to claim 8, wherein each of said communication passages extend substantially in a horizontal direction.

10. The air-cool absorption refrigeration system according to claim 8, wherein said solution sump is divided into a plurality of sections by at least one partition means.

11. The air-cooled absorption refrigeration system according to claim 8, wherein said absorber is provided with first, second and third solution sumps, and first, second and third sprayers respectively in communication with said first, second and third solution sumps through a plurality of solution lines.

* * * * *